United States Patent
Sasaki et al.

(10) Patent No.: US 11,959,250 B2
(45) Date of Patent: Apr. 16, 2024

(54) MANIPULATION MECHANISM FOR WORK MACHINE AND WORK MACHINE EQUIPPED WITH SAME

(71) Applicants: KOBELCO CONSTRUCTION MACHINERY CO., LTD., Hiroshima (JP); ASAHI INTECC CO., LTD., Seto (JP)

(72) Inventors: Hitoshi Sasaki, Hiroshima (JP); Seiji Saiki, Hiroshima (JP); Yoichiro Yamazaki, Hiroshima (JP); Kohei Nakamizo, Tokyo (JP)

(73) Assignees: Kobelco Construction Machinery Co., Ltd., Hiroshima (JP); Asahi Intecc Co., Ltd., Aichi (JP)

( * ) Notice: Subject to any disclaimer, the term of this patent is extended or adjusted under 35 U.S.C. 154(b) by 192 days.

(21) Appl. No.: 17/598,565

(22) PCT Filed: Feb. 6, 2020

(86) PCT No.: PCT/JP2020/004657
§ 371 (c)(1),
(2) Date: Sep. 27, 2021

(87) PCT Pub. No.: WO2020/202784
PCT Pub. Date: Oct. 8, 2020

(65) Prior Publication Data
US 2022/0195698 A1    Jun. 23, 2022

(30) Foreign Application Priority Data
Apr. 4, 2019 (JP) .................................. 2019-072114

(51) Int. Cl.
*E02F 9/20*    (2006.01)

(52) U.S. Cl.
CPC ............ *E02F 9/2004* (2013.01); *E02F 9/205* (2013.01)

(58) Field of Classification Search
CPC ....... E02F 9/2004; E02F 9/205; E02F 9/2008; E02F 9/2012; G05G 1/01; G05G 1/36
See application file for complete search history.

(56) References Cited

U.S. PATENT DOCUMENTS

| 5,592,999 A | * | 1/1997 | Matsuura | ............. B62K 25/283 |
| | | | | 180/227 |
| 6,622,584 B2 | * | 9/2003 | Staehle | ................. B60T 17/223 |
| | | | | 74/478 |

(Continued)

FOREIGN PATENT DOCUMENTS

| JP | H08-80887 A | 3/1996 |
| JP | 2000-127795 A | 5/2000 |

(Continued)

OTHER PUBLICATIONS

Extended European search report dated Apr. 20, 2022 issued in corresponding EP Patent Application No. 20781942.6.

*Primary Examiner* — Zakaria Elahmadi
(74) *Attorney, Agent, or Firm* — Carrier, Shende & Associates P.C.; Joseph P. Carrier; Jeffrey T. Gedeon

(57) ABSTRACT

A first operation mechanism 3 includes a first driving source 30 which generates a driving force based on a drive command and a first driving mechanism 32 which inclines a left-side traveling pedal 1c by the driving force from the first driving source 30. The first driving mechanism 32 has a first abutting portion 32a which abuts a pedal surface of the left-side traveling pedal 1c and a first driving unit 32b which inclines the left-side traveling pedal 1c by inclining the first abutting portion. The first driving unit 32b is arranged in a (Continued)

position shifted to a lateral side from a space in which the first abutting portion 32*a* moves.

6 Claims, 9 Drawing Sheets

(56) References Cited

U.S. PATENT DOCUMENTS

| | | | | |
|---|---|---|---|---|
| 2020/0002914 A1* | 1/2020 | Yoshida | ................ | E02F 3/435 |
| 2020/0362532 A1* | 11/2020 | Shiratani | ................ | E02F 3/32 |

FOREIGN PATENT DOCUMENTS

| | | | | | |
|---|---|---|---|---|---|
| JP | 2002-215250 | A | | 7/2002 | |
| JP | 2017-172174 | A | | 9/2017 | |
| JP | 2017-220117 | A | | 12/2017 | |
| KR | 2012-0052671 | A | | 5/2012 | |
| KR | 20120052671 | A | * | 5/2012 | ............ E02F 9/2004 |

* cited by examiner

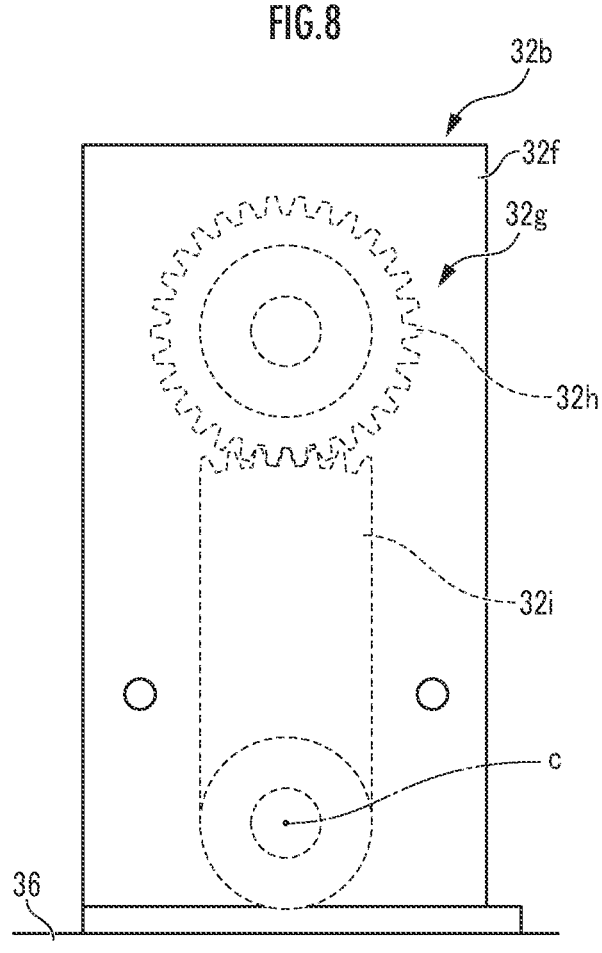

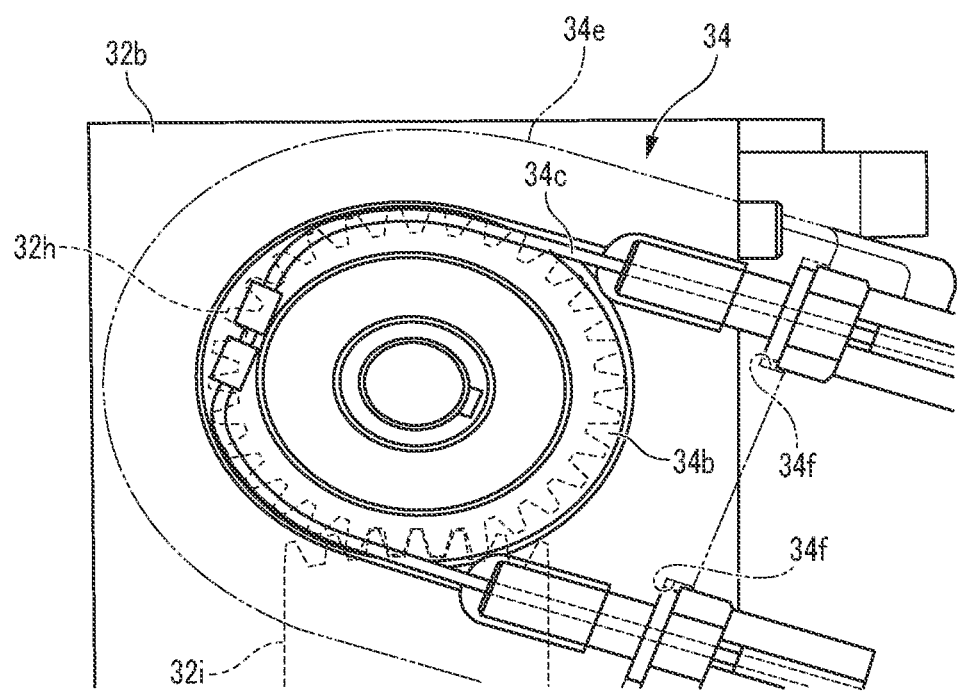

MANIPULATION MECHANISM FOR WORK MACHINE AND WORK MACHINE EQUIPPED WITH SAME

TECHNICAL FIELD

The present invention relates to a manipulation mechanism for work machine (work machine operation mechanism) based on a drive command, particularly to a manipulation mechanism for work machine for performing a remote operation of a work machine and a work machine provided with the same.

BACKGROUND ART

In related art, an manipulation mechanism has been known which indirectly operates a pedal based on a drive command transmitted from an external portion of a work machine, the pedal being capable of being directly operated in a state where an operator is seated on a seat in an internal portion of a driver room, and thereby performs a remote operation of the work machine (for example, see Patent Literature 1).

CITATION LIST

Patent Literature

Patent Literature 1
Japanese Patent Laid-Open No. 2017-172174

SUMMARY OF INVENTION

Technical Problem

However, depending on the shape of a manipulation mechanism, when an operator attempts to directly operate a pedal in a state where the manipulation mechanism is installed, the manipulation mechanism might hinder the direct operation. For example, in a case where a portion of the manipulation mechanism is present above a surface of the pedal to be stepped on, the portion restricts a motion of the foot of the operator, and an operation of the pedal by stepping by the foot might be hindered.

The present invention has been made in consideration of the above circumstance, and an object thereof is to provide a manipulation mechanism (work machine operation mechanism) in which a direct operation of a pedal by an operator is less likely to be hindered even in a case where the work machine operation mechanism is installed and a work machine including the work machine operation mechanism.

Solution to Problem

A work machine operation mechanism of the present invention is a work machine operation mechanism inclining a pedal based on a drive command, the pedal being for controlling an action of a work machine in accordance with inclination, the work machine operation mechanism including:

a driving source which generates a driving force based on the drive command; and a driving mechanism which inclines the pedal by the driving force from the driving source, in which the driving mechanism has an abutting portion which abuts a pedal surface of the pedal as a surface which is stepped on when an operator performs an operation and a driving unit which inclines the pedal by moving the abutting portion, and the driving unit is arranged in a position shifted to a lateral side from a space in which the abutting portion moves.

BRIEF DESCRIPTION OF DRAWINGS

FIG. 8 is a side view of a speed reducer of a first driving mechanism of the first operation mechanism in FIG. 4.

FIG. 9 is a side view illustrating a structure around a first driven pulley cover of the first driving mechanism of the first operation mechanism in FIG. 6.

DESCRIPTION OF EMBODIMENT

A remote operation system S according to an embodiment will hereinafter be described with reference to drawings.

First, a configuration of the remote operation system S will be described with reference to FIG. 1 to FIG. 3.

Figure 1:
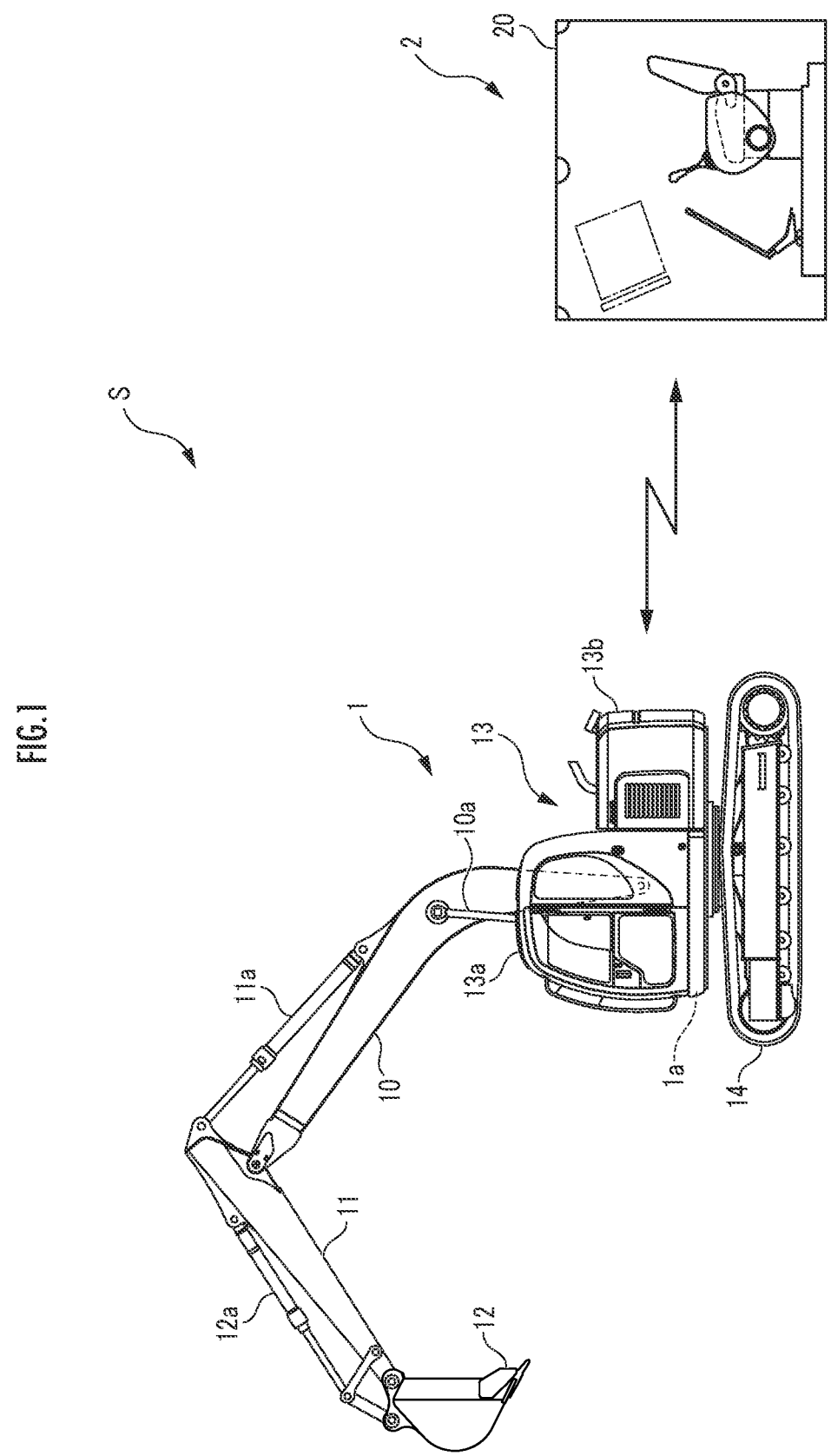
FIG. 1 is a schematic diagram illustrating a general configuration of a remote operation system of a work machine according to an embodiment.

As illustrated in FIG. 1, the remote operation system S includes a work machine 1 as a hydraulic excavator and a remote operation device 2 for performing a remote operation of the work machine 1. The work machine 1 is capable of being directly operated by an operator riding thereon and is capable of being indirectly operated via the remote operation device 2 without the operator riding thereon.

Note that in the present embodiment, as the work machine, a hydraulic excavator is used. However, the work machine of the present invention is not limited to a hydraulic excavator. For example, the work machine may be a mobile crane, a dump truck, and so forth.

The work machine 1 includes a work apparatus configured with a boom 10, an arm 11, and an attachment 12, a revolving body 13 on which the work apparatus is mounted, and a traveling body 14 revolvably supporting the revolving body 13.

A base end portion of the boom 10 is swingably attached to a front portion of the revolving body 13. The boom 10 has a first hydraulic cylinder 10a whose both ends are attached to the boom 10 and the revolving body 13. The boom 10 is swung with respect to the revolving body 13 by extending and contracting actions of the first hydraulic cylinder 10a.

A base end portion of the arm 11 is swingably attached to a distal end portion of the boom 10. The arm 11 has a second hydraulic cylinder 11a whose both ends are attached to the arm 11 and the boom 10. The arm 11 is swung with respect to the boom 10 by extending and contracting actions of the second hydraulic cylinder 11a.

The attachment 12 is swingably attached to a distal end portion of the arm 11. The attachment 12 has a third hydraulic cylinder 12a whose both ends are attached to the attachment 12 and the arm 11. The attachment 12 is swung with respect to the arm 11 by extending and contracting actions of the third hydraulic cylinder 12a.

Note that in the present embodiment, as the attachment 12, a bucket is used. However, the attachment 12 is not limited to a bucket but may be another kind of attachment (such as a crusher, a breaker, a magnet, or forks, for example).

The revolving body 13 is configured to be revolvable around a yaw axis with respect to the traveling body 14 by a revolution hydraulic motor (not illustrated). A driver room 13a on which the operator rides is provided in the front portion of the revolving body 13, and a machine room 13b is provided in a rear portion of the revolving body 13.

In the driver room 13a, a slave-side operation device 15 (see FIG. 2) for operating the work machine 1 is arranged. Examples of the slave-side operation device 15 may include operation switches and operation levers, and traveling levers 1b, a left-side traveling pedal 1c (left-side first pedal), a right-side traveling pedal 1d (right-side first pedal), a left-side option pedal 1e (left-side second pedal), a right-side option pedal 1f (right-side second pedal), and work apparatus operation levers 1i (see FIG. 4 to FIG. 6) which will be described above, and so forth.

In the machine room 13b, hydraulic apparatuses (not illustrated) such as a hydraulic pump, a direction switching valve, and a hydraulic oil tank and an engine (not illustrated) or the like as a motive power source of the hydraulic pump and so forth are housed.

The traveling body 14 is a caterpillar tread type traveling body and is driven by a traveling hydraulic motor (not illustrated). Note that the traveling body of the work machine of the present invention is not limited to a caterpillar tread. For example, the traveling body may move by wheels or may move by legged locomotion. Further, in a case where the work machine is used on the water, the traveling body may be a barge or the like.

Note that the work machine 1 may further include actuators (for example, a hydraulic actuator for driving a dozer, a hydraulic actuator included in an attachment such as a crusher, and so forth) other than the above traveling hydraulic motor, revolution hydraulic motor, first hydraulic cylinder 10a, second hydraulic cylinder 11a, and third hydraulic cylinder 12a. Further, a portion of the actuators of the work machine 1 (for example, the revolution actuator) may be an electric actuator.

When the work machine 1 is operated, the slave-side operation device 15 is operated in a state where the engine is actuated, and each of the actuators such as the traveling hydraulic motor, the revolution hydraulic motor, the first hydraulic cylinder 10a, the second hydraulic cylinder 11a, and the third hydraulic cylinder 12a is thereby actuated. Actuation of each of the actuators in accordance with an operation of the slave-side operation device 15 may be performed similarly to a known work machine, for example.

Figure 2:
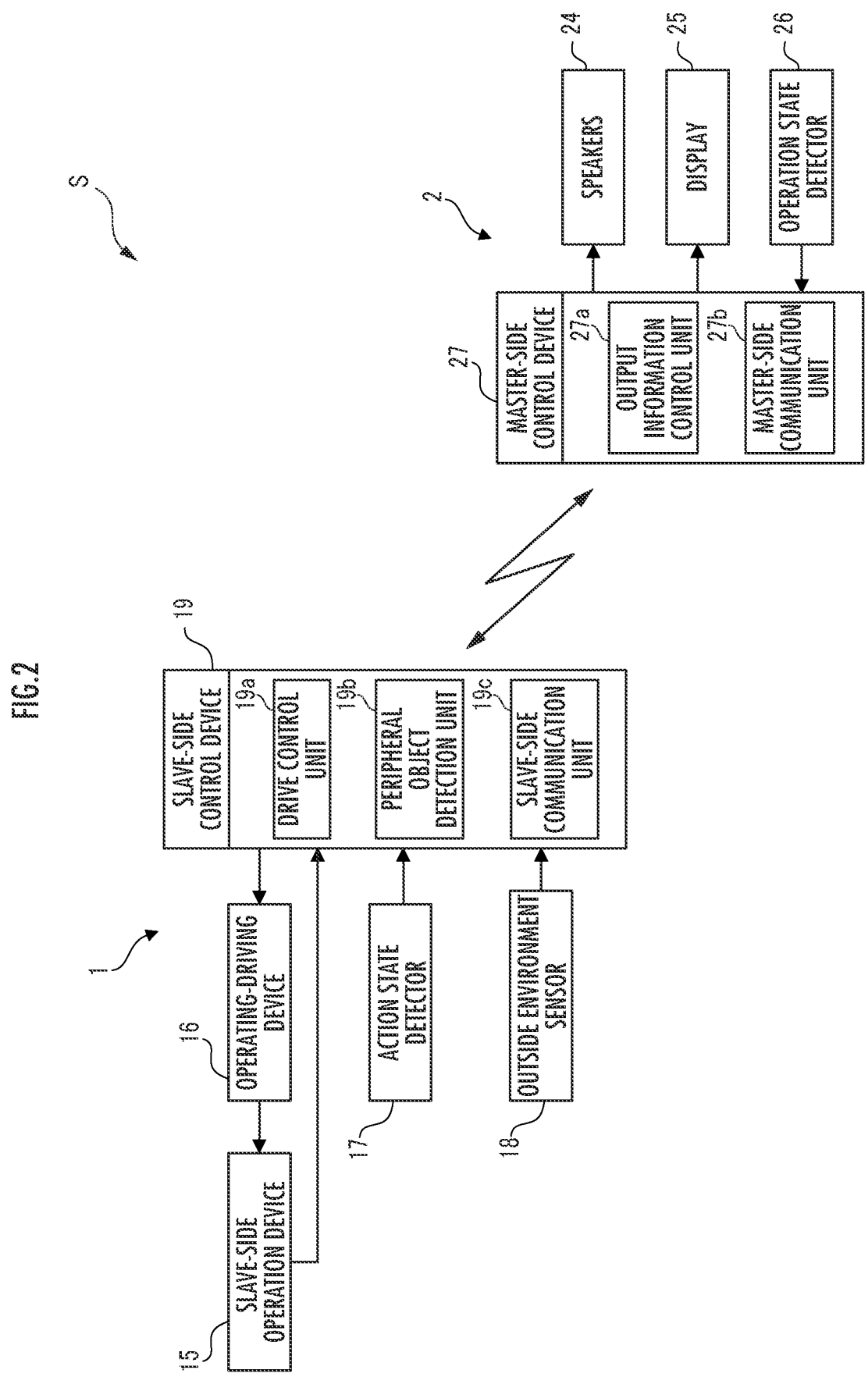
FIG. 2 is a schematic diagram illustrating an outline configuration of a remote operation device of the remote operation system in FIG. 1.

As illustrated in FIG. 2, in order to enable a remote operation, the work machine 1 includes an electric type operating-driving device 16 (for example, a first operation mechanism 3 and a second operation mechanism 4 which will be described later (see FIG. 4 and FIG. 5)) for driving the slave-side operation device 15 in the driver room 13a.

The operating-driving device 16 is connected with the slave-side operation device 15. Note that the operating-driving device 16 may be configured to be detachable from the work machine 1.

Further, the operating-driving device 16 has plural electric motors (specifically, a first driving source 30, a second driving source 31, a third driving source 40, and a fourth driving source 41 which will be described later (see FIG. 4 and FIG. 5)).

By driving forces from those electric motors, the operating-driving device 16 drives each of the operation switches and the operation levers, which are included in the slave-side operation device 15, and the traveling levers 1b, the left-side traveling pedal 1c, the right-side traveling pedal 1d, the left-side option pedal 1e, the right-side option pedal 1f, and the work apparatus operation levers 1i (see FIG. 4 to FIG. 6), which will be described later.

Further, the work machine 1 includes an action state detector 17 for detecting an action state of the work machine 1, an outside environment sensor 18 as a camera or the like detecting an ambient state of the work machine 1, and a slave-side control device 19 capable of executing various kinds of control processes.

Examples of the action state detector 17 may include a detector detecting rotation angles of respective swinging actions of the boom 10, the arm 11, and the attachment 12 or stroke lengths of the first hydraulic cylinder 10a, the second hydraulic cylinder 11a, and the third hydraulic cylinder 12a, a detector detecting a revolution angle of the revolving body 13, a detector detecting a driving speed of the traveling body 14, a detector detecting a tilt angle of the revolving body 13 or the traveling body 14, an inertia sensor detecting an angular velocity or an acceleration of the revolving body 13, and so forth.

The outside environment sensor 18 is configured with a camera, a distance measurement sensor, a radar, and so forth, for example. The camera and so forth configuring the outside environment sensor 18 are installed in plural parts such as peripheral portions of the revolving body 13 so as to be capable of detecting objects present around the revolving body 13.

The slave-side control device 19 is configured with one or more electronic circuit units including a microcomputer, a memory, an interface circuit, and so forth, for example. The slave-side control device 19 appropriately acquires a detection signal of each of the action state detector 17 and the outside environment sensor 18.

The slave-side control device 19 has a function of a drive control unit 19a, a function of a peripheral object detection unit 19b, and a function of a slave-side communication unit 19c as functions to be realized by both or either one of an implemented hardware configuration and a program (software configuration).

The drive control unit 19a performs actuation control of the operating-driving device 16 (further, operation control of the slave-side operation device 15) and drive control of the engine in accordance with the operation of the slave-side operation device 15 or a drive command given from the remote operation device 2 side and thereby controls an action of the work machine 1.

The peripheral object detection unit 19b detects an object based on a detection signal of the outside environment sensor 18 in a case where an object such as a person or an installed object is present in a predetermined target space around the work machine 1.

The slave-side communication unit 19c appropriately performs wireless communication with the remote operation device 2 side via a master-side communication unit 27b which will be described later.

Figure 3:
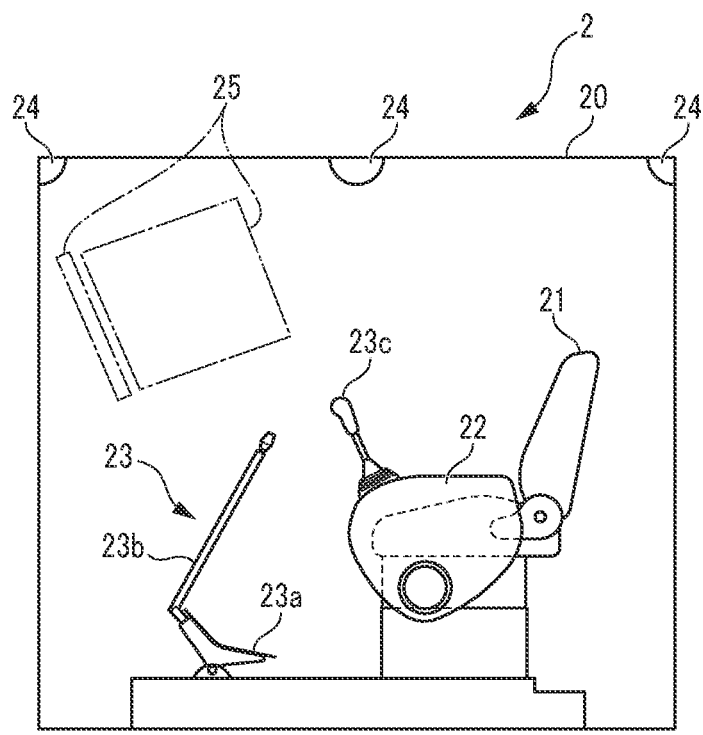
FIG. 3 is a block diagram illustrating a configuration about control of the remote operation system in FIG. 1.

As illustrated in FIG. 3, the remote operation device 2 includes, in an internal portion of a remote operation room 20, a master-side seat 21 on which the operator is seated, a pair of left and right master-side console boxes 22 arranged on the left and right of the master-side seat 21, a master-side operation device 23 that the operator operates for the remote operation of the work machine 1, speakers 24 as output devices of acoustic information (auditory information), and a display 25 as an output device of display information (visual information).

Further, as illustrated in FIG. 2, the remote operation device 2 includes an operation state detector 26 for detecting an operation state of the master-side operation device 23 and a master-side control device 27 capable of executing various kinds of control processes. Note that the master-side control device 27 may be arranged in either one of the internal portion and an external portion of the remote operation room 20.

The master-side operation device 23 has a configuration which is the same as or similar to the slave-side operation device 15 of the work machine 1, for example.

Specifically, in order to enable the operator seated on the master-side seat 21 to perform an operation, the master-side operation device 23 includes a pair of left and right first operation levers 23b with a pair of left and right first operation pedals 23a, the first operation levers 23b being installed on a front side of the master-side seat 21, a pair of left and right second operation levers 23c which are respectively mounted on the pair of left and right master-side console boxes 22, a pair of left and right second operation pedals (not illustrated) which are arranged on lateral sides while having the first operation pedals 23a interposed therebetween, and so forth.

However, the master-side operation device 23 may have a configuration which is different from the slave-side operation device 15 of the work machine 1. For example, the master-side operation device 23 may be a portable type operation device having a joystick, operation buttons, and so forth.

The operation state detector 26 is a potentiometer, a contact switch, or the like which is incorporated in the master-side operation device 23, for example. The operation state detector 26 is configured to output a detection signal indicating an operation state of each operation unit (the first operation pedal 23a, the first operation lever 23b, the second operation lever 23c, the second operation pedal, or the like) of the master-side operation device 23.

The speakers 24 are arranged in plural parts of the internal portion of the remote operation room 20 such as a front portion, a rear portion, and both of left and right sides, and so forth of the remote operation room 20, for example.

The display 25 is configured with a liquid crystal display, a head-up display, or the like, for example. The display 25 is arranged on a front side of the master-side seat 21 such that the operator seated on the master-side seat 21 can visually recognize the display 25.

The master-side control device 27 is configured with one or more electronic circuit units including a microcomputer, a memory, an interface circuit, and so forth, for example. The master-side control device 27 appropriately acquires a detection signal of the operation state detector 26. Based on this detection signal, the master-side control device 27 recognizes a drive command for the work machine 1, the drive command being defined in accordance with an operation state of the master-side operation device 23.

The master-side control device 27 has a function of an output information control unit 27a and a function of the master-side communication unit 27b as functions to be realized by both or either one of an implemented hardware configuration and a program (software configuration).

The output information control unit 27a controls the speakers 24 and the display 25.

The master-side communication unit 27b appropriately performs wireless communication with the work machine 1 side via the slave-side communication unit 19c. By this wireless communication, the master-side control device 27 transmits the drive command for the work machine 1 to the slave-side control device 19 and receives various kinds of information on the work machine 1 side (such as photographed pictures by the camera, detection information of an object around the work machine 1, and detection information of the action state of the work machine 1) from the slave-side control device 19.

Here, referring to FIG. 1 and FIG. 3 to FIG. 6, a description will be made about mechanisms in the slave-side operation device 15, which are installed in the internal portion of the driver room 13a of the work machine 1 and are operated when the operator directly operates the work machine 1.

As illustrated in FIG. 1, the work machine 1 includes the traveling body 14 and the revolving body 13 which is revolvably installed above the traveling body 14. Specifically, with respect to a lower frame (not illustrated) provided to the traveling body 14, an upper frame 1a provided to the revolving body 13 is revolvably supported.

The driver room 13a is provided on a front side of the upper frame 1a, and the machine room 13b is provided on a rear side. The work apparatus formed with the boom 10, the arm 11, and the attachment 12 is attached to a lateral side of the driver room 13a.

Figure 4:
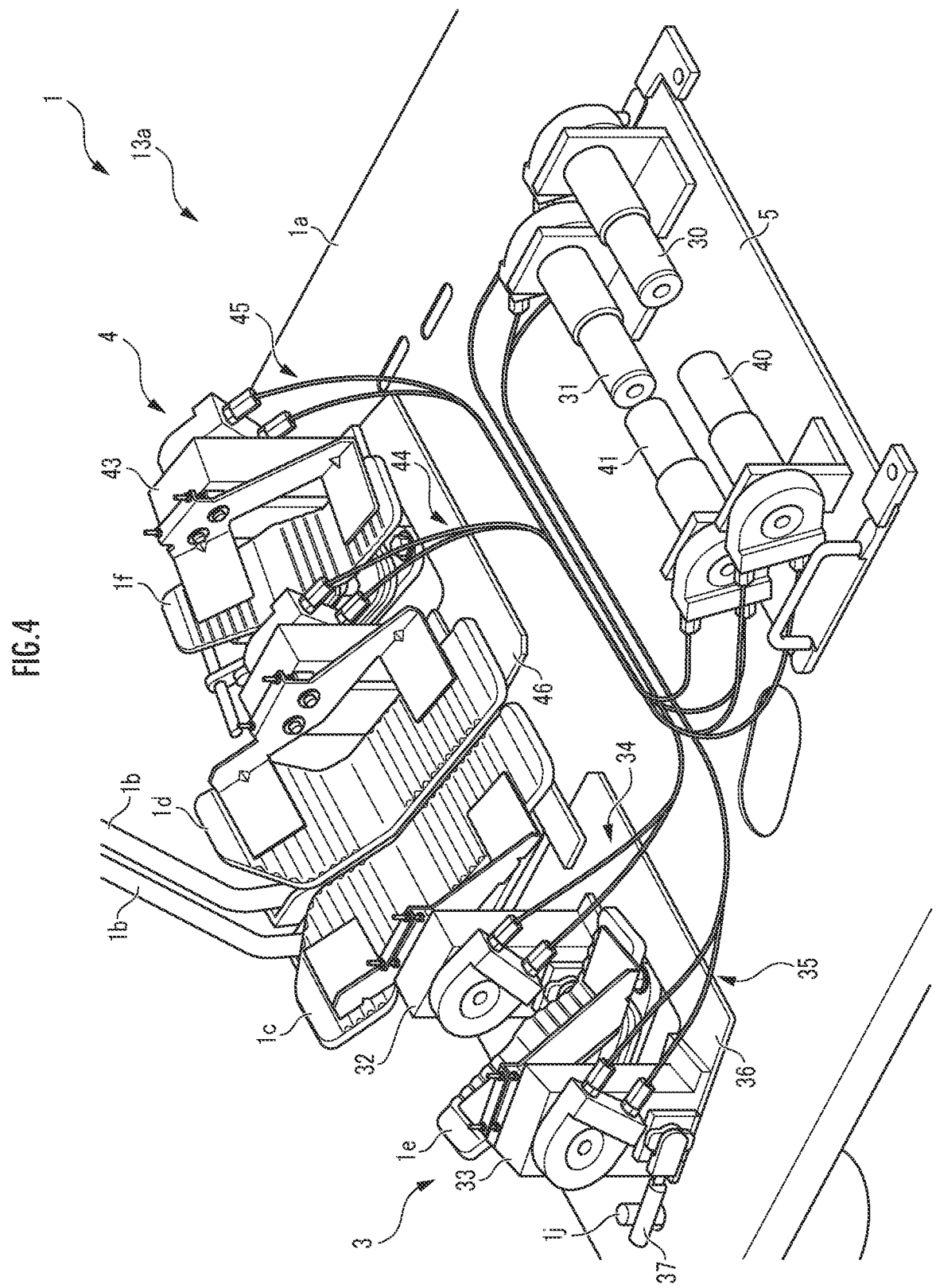
FIG. 4 is a perspective view illustrating general configurations of a first operation mechanism and a second operation mechanism of the work machine in FIG. 1.
Figure 5:
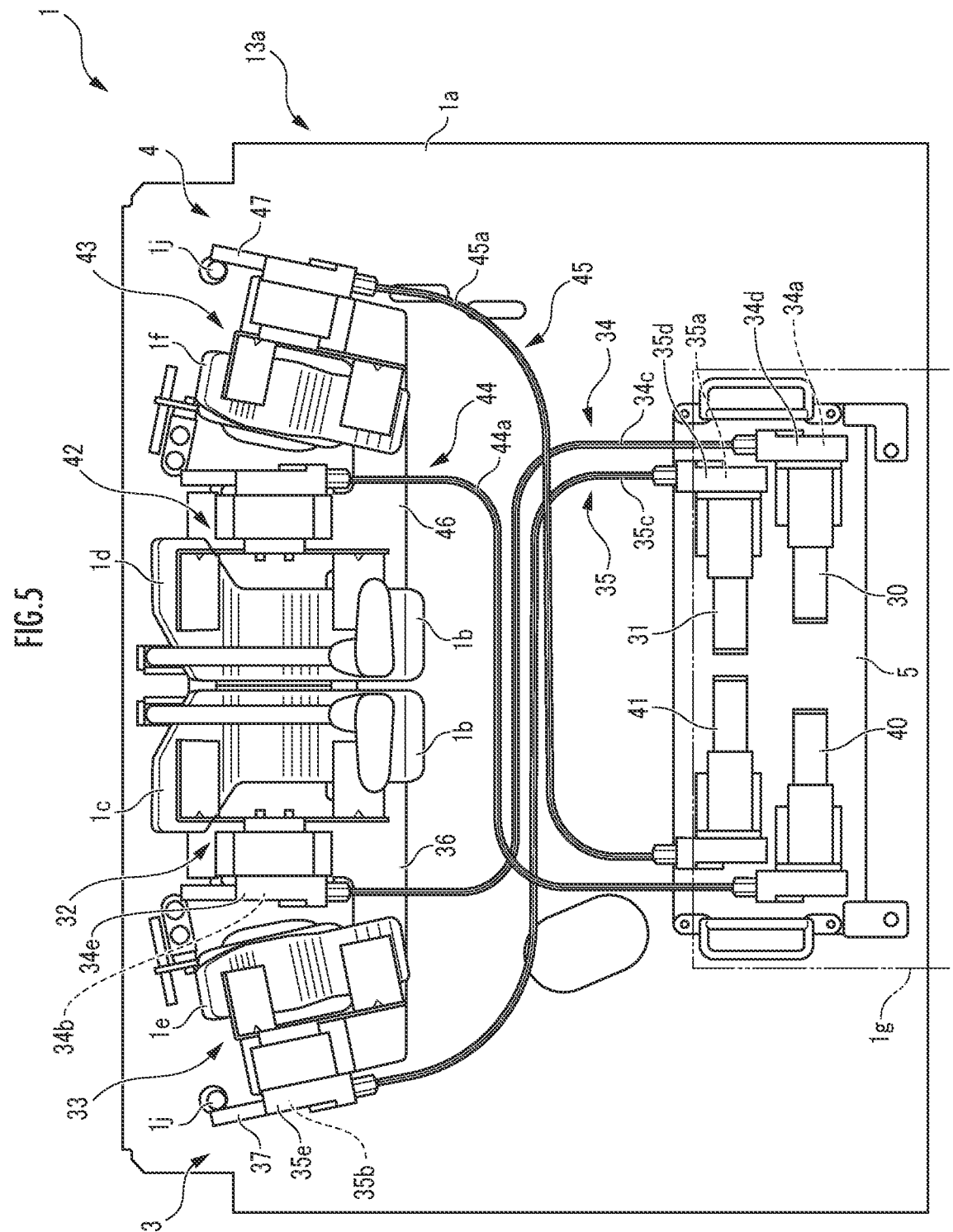
FIG. 5 is a plan view illustrating the general configurations of the first operation mechanism and the second operation mechanism of the work machine in FIG. 1.

As illustrated in FIG. 4 and FIG. 5, the work machine 1 has a pair of left and right traveling levers 1b arranged at a general center in a left-right direction in a planar view in a position which is above the upper frame 1a and is on a front side of the internal portion of the driver room 13a.

Further, the work machine 1 has, in a planar view, the left-side traveling pedal 1c (first pedal) arranged on a left side of the traveling levers 1b, the right-side traveling pedal 1d (first pedal) arranged on a right side of the traveling levers 1b, the left-side option pedal 1e (second pedal) arranged on a left side of the left-side traveling pedal 1c, and the right-side option pedal 1f (second pedal) arranged on a right side of the right-side traveling pedal 1d.

The pair of left and right traveling levers 1b swing together with the left-side traveling pedal 1c and the right-side traveling pedal 1d which correspond to those. The pair of left and right traveling levers 1b, the left-side traveling pedal 1c, and the right-side traveling pedal 1d are mechanisms for operating each of left and right caterpillar treads of the traveling body 14 (see FIG. 1). The actions of those caterpillar treads (that is, traveling of the work machine 1) are controlled in accordance with the inclination of the corresponding traveling lever 1b, left-side traveling pedal 1c, or right-side traveling pedal 1d.

The left-side option pedal 1e and the right-side option pedal 1f are mechanisms for operating the attachment 12 (see FIG. 1). In a case where the attachment 12 is the forks, for example, rotation of the attachment 12 around an axis line of the arm 11 is controlled in accordance with the inclination of the left-side option pedal 1e. Further, opening and closing of the forks are controlled in accordance with the inclination of the right-side option pedal 1f.

When the operator rides on the work machine 1 and directly operates the work machine 1, the operator steps on a pedal surface of the left-side traveling pedal 1c, the right-side traveling pedal 1d, the left-side option pedal 1e, or the right-side option pedal 1f, thereby inclines the pedal to one side in a front-rear direction, and controls the action of the work apparatus or the action of the traveling body 14.

The traveling levers 1b correspond to the pair of left and right first operation levers 23b of the remote operation device 2, and the left-side traveling pedal 1c and the right-side traveling pedal 1d correspond to the pair of left and right first operation pedals 23a of the remote operation device 2 (see FIG. 3).

That is, the first operation mechanism 3 and the second operation mechanism 4, each of which is one of the operating-driving device 16 and which will be described later, incline the traveling levers 1b, the left-side traveling pedal 1c, and the right-side traveling pedal 1d based on the drive command from the remote operation device 2

Specifically, the first operation mechanism 3 and the second operation mechanism 4 incline the traveling levers 1b in accordance with the inclination of the pair of left and right first operation levers 23b of the remote operation device 2 and incline the left-side traveling pedal 1c and the right-side traveling pedal 1d in accordance with the inclination of the pair of left and right first operation pedals 23a of the remote operation device 2.

Further, the left-side option pedal 1e and the right-side option pedal 1f correspond to the pair of left and right second operation pedals (not illustrated) of the remote operation device 2.

That is, the first operation mechanism 3 and the second operation mechanism 4, each of which is one of the operating-driving device 16 and which will be described later, incline the corresponding left-side option pedal 1e and right-side option pedal 1f based on the drive command from the remote operation device 2 (that is, in accordance with the inclination of the pair of left and right second operation pedals of the remote operation device 2).

Figure 6:
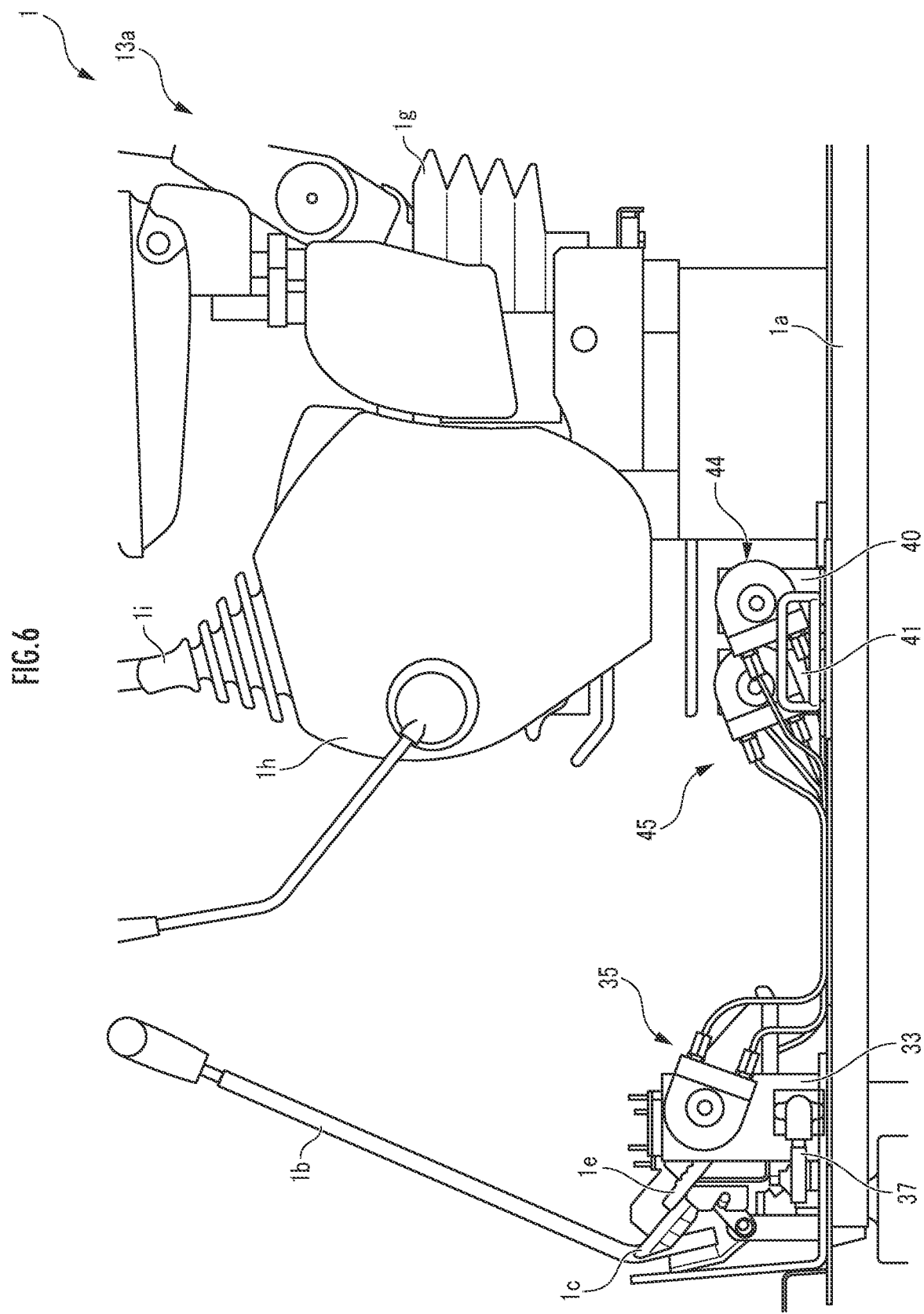
FIG. 6 is a side view illustrating a configuration of a machine room of the work machine in FIG. 1.

Further, as illustrated in FIG. 6, the work machine 1 has a slave-side seat 1g on which the operator is seated, a pair of left and right slave-side console boxes 1h arranged on the left and right of the slave-side seat 1g, and the pair of left and right work apparatus operation levers 1i installed in the respective slave-side console boxes 1h in a position which is above the upper frame 1a and is on a rear side of the internal portion of the driver room 13a.

The work apparatus operation levers 1i are mechanisms for controlling the work apparatus (that is, the boom 10, the arm 11, and the attachment 12). Up-down movement, revolution, inward-outward movement of the work apparatus are controlled in accordance with the inclination of the work apparatus operation levers 1i.

Further, the pair of left and right work apparatus operation levers 1i correspond to the pair of left and right second operation levers 23c (see FIG. 3) of the remote operation device 2.

That is, a third operation mechanism (not illustrated), which is one of the operating-driving device 16 and will be described later, inclines the corresponding work apparatus operation lever 1i based on the drive command from the remote operation device 2 (that is, in accordance with the inclination of the second operation lever 23c of the remote operation device 2).

Next, referring to FIG. 4 to FIG. 9, a detailed description will be made about configurations of the first operation mechanism 3 (work machine operation mechanism) and the second operation mechanism 4 (work machine operation mechanism), each of which is one of the operating-driving device 16. Note that for easy understanding, in FIG. 7, a first wire 34c of a first transmission mechanism 34 and a second wire 35c of a second transmission mechanism 35 are not illustrated.

As illustrated in FIG. 4 and FIG. 5, the first operation mechanism 3 includes the first driving source 30 and the second driving source 31 which generate driving forces, a first driving mechanism 32 (first pedal driving mechanism) for operating the left-side traveling pedal 1c, a second driving mechanism 33 (second pedal driving mechanism) for operating the left-side option pedal 1e, the first transmission mechanism 34 which transmits the driving force from the first driving source 30 to the first driving mechanism 32, and the second transmission mechanism 35 which transmits the driving force from the second driving source 31 to the second driving mechanism 33.

The first driving source 30 and the second driving source 31 are electric motors and generate driving forces based on the drive command from the remote operation device 2. The first driving source 30 and the second driving source 31 are arranged below the slave-side seat 1g (see FIG. 6). This is because in general, an available space is often present below the slave-side seat 1g (particularly below a front portion of a seated portion).

Figure 7:
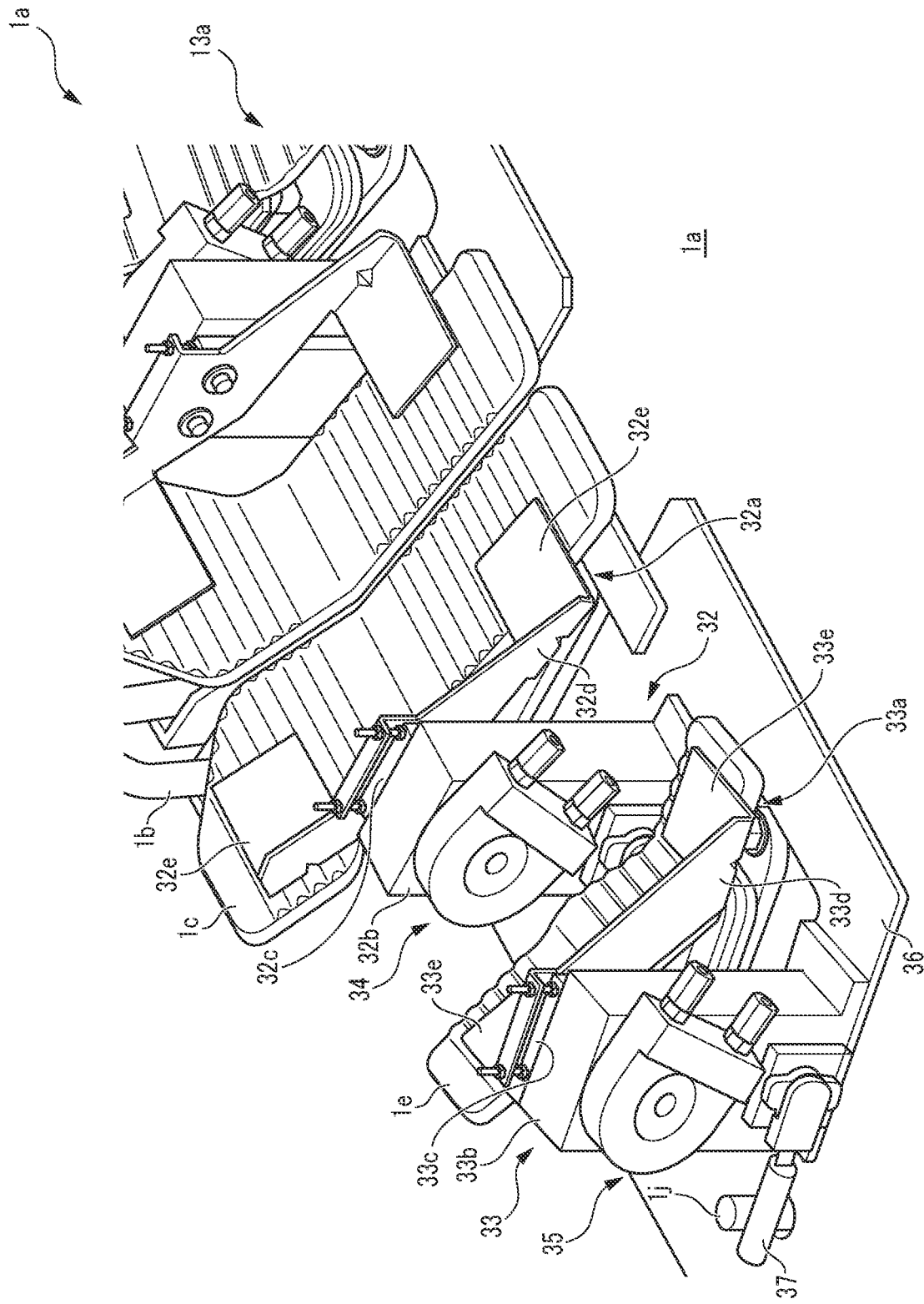
FIG. 7 is a perspective view illustrating the first operation mechanism in FIG. 4 while enlarging principal components.

The first driving mechanism 32 is driven by the driving force from the first driving source 30 to incline the left-side traveling pedal 1c. The first driving mechanism 32 is arranged adjacently to the left-side traveling pedal 1c as its operation target As illustrated in FIG. 7, the first driving mechanism 32 has a first abutting portion 32a which abuts the pedal surface of the left-side traveling pedal 1c and a first driving unit 32b which inclines the first abutting portion 32a and thereby inclines the left-side traveling pedal 1c.

The first abutting portion 32a has a first rotating portion 32c pivotally and rotatably supported by the first driving unit 32b, a first arm portion 32d which is detachable from the first rotating portion 32c and in a plate shape extending in the front-rear direction, and a pair of front and rear first plate-shaped portions 32e which are provided to extend from both of front and rear end portions of the first arm portion 32d toward the left-side traveling pedal 1c side.

The first rotating portion 32c is arranged on the left-side traveling pedal 1c side of the first driving unit 32b. The first rotating portion 32c is attached to a housing 32f, which will be described later, of the first driving unit 32b so as to be rotatable around an inclination fulcrum c (see FIG. 8) as a center in a lower portion of the first rotating portion 32c such that an upper portion of the first rotating portion 32c is capable of inclining in the direction corresponding to an inclination direction of the left-side traveling pedal 1c.

The first arm portion 32d is detachably attached to the upper portion of the first rotating portion 32c by bolts, nuts, and so forth. The first arm portion 32d is capable of being attached to the first rotating portion 32c while a height and a tilt angle are adjusted in predetermined ranges. Accordingly, in accordance with the shape of the left-side traveling pedal 1c as the operation target, it is possible to adjust the height and the tilt angle of the first arm portion 32d with respect to the first rotating portion 32c.

As illustrated in FIG. 8, the first driving unit 32b has the housing 32f in a rectangular cuboid shape, which is provided to stand on a first coupling portion 36 which will be described later, and a speed reducer 32g configured in an internal portion of the housing 32f.

The housing 32f (that is, the first driving unit 32b) is arranged in a position shifted to a lateral side from a space in which the first abutting portion 32a moves (see FIG. 7). Specifically, the first driving unit 32b is arranged in a position shifted in a rotation center axis line direction of the first plate-shaped portions 32e from a space in which the first plate-shaped portions 32e of the first abutting portion 32a move.

As illustrated in FIG. 8, the speed reducer 32g has a first gear 32h and a second gear 32i which is arranged below the first gear 32h and meshes with the first gear 32h from a lower side.

The first gear 32h integrally rotates with a first driven pulley 34b which will be described later. The first rotating portion 32c of the first abutting portion 32a is joined to the second gear 32i. In a state where the first rotating portion 32c is connected with the second gear 32i, the second gear 32i integrally rotates with the first rotating portion 32c.

In the speed reducer 32g, the first gear 32h and the second gear 32i are arranged to be arrayed in an up-down direction. This is for decreasing the sizes of the first driving unit 32b in the front-rear direction and in the left-right direction. Accordingly, because the first driving unit 32b is inhibited from projecting in a path for getting on and off, a situation is inhibited where getting on and off of the operator is hindered by the first driving unit 32b.

Note that the speed reducer of the present invention is not limited to such a configuration; however, the speed reducer may be configured by using three or more gears, or the gears may be arranged to be arrayed in the left-right direction.

Further, as illustrated in FIG. 7, the second driving mechanism 33 is driven by the driving force from the second driving source 31 to incline the left-side option pedal 1e. The second driving mechanism 33 is arranged adjacently to the left-side option pedal 1e as its operation target.

Similarly to the first driving mechanism 32, the second driving mechanism 33 has a second abutting portion 33a which abuts the pedal surface of the left-side option pedal 1e and a second driving unit 33b which inclines the second abutting portion 33a and thereby inclines the left-side option pedal 1e.

The second abutting portion 33a has a second rotating portion 33c pivotally and rotatably supported by the second driving unit 33b, a second arm portion 33d which is detachable from the second rotating portion 33c and in a plate shape extending in the front-rear direction, and a pair of front and rear second plate-shaped portions 33e which are provided to extend from both of front and rear end portions of the second arm portion 33d toward the left-side option pedal 1e side.

The second rotating portion 33c is arranged on the left-side option pedal 1e side of the second driving unit 33b. The second rotating portion 33c is attached to a housing of the second driving unit 33b so as to be rotatable around a predetermined inclination fulcrum as a center in a lower portion of the second rotating portion 33c such that an upper portion of the second rotating portion 33c is capable of inclining in the direction corresponding to an inclination direction of the left-side option pedal 1e.

The second arm portion 33d is detachably attached to the upper portion of the second rotating portion 33c by a bolt, a nut, and so forth. The second arm portion 33d is capable of being attached to the second rotating portion 33c while a height and a tilt angle are adjusted in predetermined ranges. Accordingly, in accordance with the shape of the left-side option pedal 1e as the operation target, it is possible to adjust the height and the tilt angle of the second arm portion 33d with respect to the second rotating portion 33c.

The second driving unit 33b is arranged in a position shifted in a rotation center axis line direction of the second plate-shaped portions 33e from a space in which the second plate-shaped portions 33e of the second abutting portion 33a move.

In such a manner, in the first operation mechanism 3, the first abutting portion 32a abuts the pedal surface of the left-side traveling pedal 1c. Further, the left-side traveling pedal 1c is inclined by being pushed by the inclined first abutting portion 32a. That is, the left-side traveling pedal 1c can be inclined also by moving the first abutting portion 32a by stepping or the like by the operator.

Further, in the first operation mechanism 3, the second abutting portion 33a abuts the pedal surface of the left-side option pedal 1e. Further, the left-side option pedal 1e is inclined by being pushed by the inclined second abutting portion 33a. That is, the left-side option pedal 1e can be inclined also by moving the second abutting portion 33a by stepping or the like by the operator.

Accordingly, even in a state where the first operation mechanism 3 is installed, the operator steps on the left-side traveling pedal 1c together with the first abutting portion 32a and can thereby operate the left-side traveling pedal 1c. Further, even in a state where the first operation mechanism 3 is installed, the operator steps on the left-side option pedal 1e together with the second abutting portion 33a and can thereby operate the left-side option pedal 1e.

In addition to this, in the first operation mechanism 3, the first abutting portion 32a which abuts the left-side traveling pedal 1c and the first driving unit 32b which moves the first abutting portion 32a are arranged as separate bodies, and the first driving unit 32b is arranged in a position shifted to a lateral side from the space in which the first abutting portion 32a moves. Accordingly, even in a state where the first operation mechanism 3 is installed, when the operator operates the left-side traveling pedal 1c, the first driving unit 32b is less likely to contact with the foot of the operator.

Further, in the first operation mechanism 3, the second abutting portion 33a which abuts the left-side option pedal 1e and the second driving unit 33b which moves the second abutting portion 33a are arranged as separate bodies, and the second driving unit 33b is arranged in a position shifted to a lateral side from the space in which the second abutting portion 33a moves. Accordingly, even in a state where the first operation mechanism 3 is installed, when the operator operates the left-side option pedal 1e, the second driving unit 33b is less likely to contact with the foot of the operator.

Consequently, in the first operation mechanism 3, even in a state where that is installed, direct operations of the left-side traveling pedal 1c and the left-side option pedal 1e by the operator are less likely to be hindered by the first abutting portion 32a, the second abutting portion 33a, the first driving unit 32b, and the second driving unit 33b.

Note that in the present embodiment, the first abutting portion 32a inclines around the inclination fulcrum c as the center, thereby pushes the left-side traveling pedal 1c, and inclines the left-side traveling pedal 1c. Further, the second abutting portion 33a inclines around the predetermined inclination fulcrum as the center, thereby pushes the left-side option pedal 1e, and inclines the left-side option pedal 1e. However, actions of the abutting portions of the present invention are not limited to such configurations, but movement is adequate in which a pedal as an operation target is pushed and the pedal can thereby be inclined.

For example, the inclination fulcrum may appropriately be set in accordance with the shape of a pedal as an operation target and the manner of inclination. In particular, when the inclination fulcrum is set to agree with a rotation axis line of the pedal as the operation target, because the inclination manners of the abutting portion and the pedal agree with each other, discomfort can be reduced which occurs when the operator steps on the pedal together with the abutting portion.

Further, for example, movement of the abutting portion may be forward-backward movement in the up-down direction, the front-rear direction, or the left-right direction instead of inclination (that is, rotation around a predetermined fulcrum as a center).

Further, in the present embodiment, the first driving unit 32b is arranged in a position shifted in the rotation center axis line direction (that is, the left-right direction) of the first plate-shaped portions 32e from the space in which the first plate-shaped portions 32e of the first abutting portion 32a move. Further, the second driving unit 33b is arranged in a position shifted in the rotation center axis line direction (that is, the left-right direction) of the second plate-shaped portions 33e from the space in which the second plate-shaped portions 33e of the second abutting portion 33a move.

However, the present invention is not limited to such configurations, but it is sufficient that the driving unit is arranged in a position shifted to a lateral side from a space in which the abutting portion moves. For example, the driving unit may be arranged in a position shifted in either one of the front-rear direction and the up-down direction from the space in which the abutting portion moves.

As illustrated in FIG. 5, the first transmission mechanism 34 has a first driving pulley 34a which rotates by the driving force from the first driving source 30, the first driven pulley 34b to which the driving force from the first driving pulley 34a is transmitted, the first wire 34c which transmits the driving force from the first driving pulley 34a to the first driven pulley 34b, a first driving pulley cover 34d which covers the first driving pulley 34a, and a first driven pulley cover 34e which covers the first driven pulley 34b.

The first driving pulley 34a is attached to a driving shaft of the first driving source 30. Thus, the first driving pulley 34a rotates in accordance with driving of the first driving source 30 (that is, the drive command)

The first driven pulley 34b is attached to the first gear 32h of the speed reducer 32g of the first driving unit 32b of the first driving mechanism 32 and integrally rotates with the first gear 32h. The driving force transmitted to the first driven pulley 34b is transmitted to the first abutting portion 32a via the first driving unit 32b and thereby rotates the first abutting portion 32a.

As illustrated in FIG. 9, the first driven pulley cover 34e has insertion holes 34f through which the first wire 34c is inserted so as to be capable of moving forward and backward. The insertion hole 34f opens toward the upper frame 1a side. Specifically, the insertion hole 34f opens downward at an angle of approximately 20 degrees with respect to a horizontal plane passing through the center of the first driven pulley 34b. The first driving pulley cover 34d has insertion holes similar to those of the first driven pulley cover 34e.

As illustrated in FIG. 5, the second transmission mechanism 35 has a second driving pulley 35a which rotates by the driving force from the second driving source 31, a second driven pulley 35b to which the driving force from the second driving pulley 35a is transmitted, the second wire 35c which transmits the driving force from the second driving pulley 35a to the second driven pulley 35b, a second driving pulley cover 35d which covers the second driving pulley 35a, and a second driven pulley cover 35e which covers the second driven pulley 35b.

The second driving pulley 35a is attached to a driving shaft of the second driving source 31. Thus, the second driving pulley 35a rotates in accordance with driving of the second driving source 31 (that is, the drive command)

The second driven pulley 35b is attached to the second driving unit 33b of the second driving mechanism 33. The driving force transmitted to the second driven pulley 35b is transmitted to the second abutting portion 33a via the second driving unit 33b and thereby rotates the second abutting portion 33a.

Similarly to the first driving pulley cover 34d and the first driven pulley cover 34e, the second driving pulley cover 35d and the second driven pulley cover 35e also have insertion holes which are opened downward.

In the work machine 1, as described above, the first driving source 30 and the second driving source 31 of the first operation mechanism 3 are arranged below the slave-side seat 1g (that is, on a rear side of the driver room 13a). Further, the first driving unit 32b and the second driving unit 33b of the first operation mechanism 3 are arranged adjacently to the left-side traveling pedal 1c and the left-side option pedal 1e as their operation targets (that is, on a front side of the driver room 13a).

Furthermore, a space between the first driving source 30 with the second driving source 31 and the first driving unit 32b with the second driving unit 33b is usually used as the path for getting on and off or as a space where the operator temporarily puts the foot in a direct operation by the operator. Thus, the first wire 34c and the second wire 35c which are disposed in the space might hinder getting on and off of the operator in riding and a direct operation by the operator.

Consequently, in the work machine 1, the insertion holes through which the wires are inserted in the first driving pulley cover 34d, the first driven pulley cover 34e, the second driving pulley cover 35d, and the second driven pulley cover 35e are opened downward (toward the upper frame 1a side).

Accordingly, as illustrated in FIG. 6, the wire passing through the insertion hole is guided to the upper frame 1a side and is thus disposed in a position, which is as low as possible (specifically, like being placed closely along a floor), in the space. Thus, in the work machine 1, a situation is prevented where in getting on and off and performing a direct operation, actions such as getting on and off and an operation by the operator are hindered by the wires.

Note that when the wires are disposed to be placed closely along the floor, a floor mat is easily installed on the wires. Then, when the floor mat is installed in such a manner, a situation is further prevented where actions such as getting on and off and an operation by the operator are hindered by the wires.

Note that the transmission mechanism of the present invention is not limited to such a configuration, but a configuration is adequate in which the driving force from the driving source is transmitted to the driving mechanism. For example, the transmission mechanism may be other than a transmission mechanism using pulleys and wires. Specifically, a link mechanism formed with plural links is possible. Further, even when the transmission mechanism uses the pulleys and the wires, the pulley covers may be omitted, and the insertion holes of the pulley covers may be opened toward another side than the frame side.

As illustrated in FIG. 4 to FIG. 6, in the first operation mechanism 3, the first driving mechanism 32 and the second driving mechanism 33 are configured as one unit by coupling those together by the first coupling portion 36 formed with one plate. The position of the first driving mechanism 32 and the position of the second driving mechanism 33 which are fixed by this first coupling portion 36 are the positions corresponding to the position of the left-side traveling pedal 1c and the position of the left-side option pedal 1e.

Accordingly, in a case of attaching the first operation mechanism 3, when one of the first driving mechanism 32 and the second driving mechanism 33 is installed in the position corresponding to the left-side traveling pedal 1c or the left-side option pedal 1e which corresponds to the one, the other is automatically installed in the position corresponding to the left-side traveling pedal 1c or the left-side option pedal 1e which corresponds to the other.

As described above, the work machine 1 has the first coupling portion 36, and omission of a portion of positioning work, simplification of attachment work, and further reduction in workload related to attachment work are thereby intended.

Further, in an outermost front portion of the first coupling portion 36 in the left-right direction (on a left side in FIG. 5), a first positioning protrusion 37 protruding forward is provided. When the first coupling portion 36 (further, the first operation mechanism 3) is attached to the work machine 1, this first positioning protrusion 37 is caused to abut one of a pair of left and right frame-side positioning protrusions 1j provided to the upper frame 1a, and positioning of the first operation mechanism 3 can thereby be performed.

Note that the present invention is not limited to such a configuration, but the shape of the coupling portion and presence or absence of the coupling portion may appropriately be changed.

For example, the first coupling portion 36 in the present embodiment may be integrated with a second coupling portion 46 which will be described later. Further, a coupling portion may be provided which integrates together portions for operating the left and right traveling pedals of the operation mechanism, or a coupling portion may be provided which integrates together portions for operating the left and right option pedals of the operation mechanism. Further, the positioning protrusions and further the coupling portions themselves may be omitted.

Further, for example, the coupling portion is not limited to that in a plate shape but may be that in a frame shape.

Note that in the work machine 1 of the present embodiment, the first driving source 30, the second driving source 31, and the third driving source 40 and fourth driving source 41 which will be described later are coupled together by a driving source coupling portion 5 formed with one plate and are thereby configured as one unit. Accordingly, reduction in workload related to attachment work for those driving sources is also intended.

As illustrated in FIG. 5, in the first operation mechanism 3, the first driving source 30 and the second driving source 31 are arranged below the slave-side seat 1g installed on the rear side of the driver room 13a. Meanwhile, the first driving mechanism 32 and the second driving mechanism 33 are arranged on lateral sides of the left-side traveling pedal 1c and the left-side option pedal 1e as the operation targets (that is, on the front side of the driver room 13a). That is, the first driving source 30 and the second driving source 31 are arranged apart, in the front-rear direction, from the first driving mechanism 32 and the second driving mechanism 33.

In addition to this, in the work machine 1, as described above, the first driving source 30 and the first driving mechanism 32 corresponding to that are made as separate bodies, and the second driving source 31 and the second driving mechanism 33 corresponding to that are made as separate bodies.

In the work machine 1, by those configurations, an improvement in layout freedom in installing the first operation mechanism 3 is intended. Consequently, even when an installation place is a narrow space such as a place around the pedals, the first operation mechanism 3 can easily be installed in the space. Further, even in a case where the first operation mechanism 3 is installed, a sufficient space can be secured around the left-side traveling pedal 1c and the left-side option pedal 1e in the work machine 1. Moreover, direct operations of the pedals by the operator are less likely to be hindered.

Further, as illustrated in FIG. 4 and FIG. 5, the second operation mechanism 4 includes the third driving source 40 and the fourth driving source 41 which generate driving forces, a third driving mechanism 42 (first pedal driving mechanism) for operating the right-side traveling pedal 1d, a fourth driving mechanism 43 (second pedal driving mechanism) for operating the right-side option pedal 1f, a third transmission mechanism 44 which transmits the driving force from the third driving source 40 to the third driving mechanism 42, and a fourth transmission mechanism 45 which transmits the driving force from the fourth driving source 41 to the fourth driving mechanism 43.

In the second operation mechanism 4, the third driving mechanism 42 and the fourth driving mechanism 43 are configured as one unit by coupling those together by the second coupling portion 46 formed with one plate. Further, in an outermost front portion of the second coupling portion 46 in the left-right direction (on a right side in FIG. 5), a second positioning protrusion 47 protruding forward is provided.

Those configuration members of the second operation mechanism 4 are in generally the same configuration as the first operation mechanism 3 except the point that those configuration members are inverted in the left-right direction across a perpendicular plane which passes through a portion between the pair of traveling levers 1b and extends in the front-rear direction. Thus, similar effects to the first operation mechanism 3 can be obtained also by the second operation mechanism 4.

Here, as illustrated in FIG. 5, in the work machine 1, in a planar view, the pedals for operating the work machine 1 are arranged in order, from the left side, of the left-side option pedal 1e, the left-side traveling pedal 1c, the right-side traveling pedal 1d, and the right-side option pedal 1f.

Thus, in a planar view, the driving mechanisms of the first operation mechanism 3 and the second operation mechanism 4 are arranged in order, from the left side, of the second driving mechanism 33 for operating the left-side option pedal 1e, the first driving mechanism 32 for operating the left-side traveling pedal 1c, the third driving mechanism 42 for operating the right-side traveling pedal 1d, and the fourth driving mechanism 43 for operating the right-side option pedal 1f.

Meanwhile, in a planar view, the driving sources of the first operation mechanism 3 and the second operation mechanism 4 are arranged in order, from the left side, of the third driving source 40 corresponding to the third driving mechanism 42, the fourth driving source 41 corresponding to the fourth driving mechanism 43, the second driving source 31 corresponding to the second driving mechanism 33, and the first driving source 30 corresponding to the first driving mechanism 32. Further, in a planar view, those driving sources are arranged on a rear side of and apart from the pedals.

Thus, as illustrated in FIG. 5, the wires of the transmission mechanisms for transmitting the driving forces from the driving sources to the driving mechanisms in the first operation mechanism 3 and the second operation mechanism 4 are arranged to intersect between the driving sources and the driving mechanisms.

Specifically, the first wire 34c which transmits the driving force from the first driving source 30 to the first driving mechanism 32 and the second wire 35c which transmits the driving force from the second driving source 31 to the second driving mechanism 33 are arranged to intersect with the third wire 44a which transmits the driving force from the third driving source 40 to the third driving mechanism 42 and the fourth wire 45a which transmits the driving force from the fourth driving source 41 to the fourth driving mechanism 43 in a central portion of the upper frame 1a.

When the driving sources and the driving mechanisms are arranged in such a manner, the distances between the driving sources and the corresponding driving mechanisms, that is, the lengths of the wires which respectively connect those together can be made generally uniform. Accordingly, the wires to be used are shared, and facilitation of installation work and an improvement in productivity can thereby be intended.

Note that the arrangement relationship among the driving mechanisms and the driving sources in the present invention is not necessarily limited to such an arrangement relationship. For example, in a case where the lengths of the wires may be different from each other, the driving mechanisms and the driving sources may not have to be arranged to form symmetry as in the present embodiment In the foregoing, the illustrated embodiment has been described; however, the present invention is not limited to such a form.

For example, in the above embodiment, the first pedal driving mechanism is configured to operate the traveling pedal, and the second pedal driving mechanism is configured to operate the option pedal arranged adjacently to the traveling pedal. However, the present invention is not limited to such configurations, but it is sufficient that two pedals are capable of being operated.

For example, one of the pair of left and right traveling pedals may be operated by the first pedal driving mechanism, and the other of the pair of left and right traveling pedals may be operated by the second pedal driving mechanism.

Further, in the above embodiment, both of the first pedal driving mechanism for operating the traveling pedal and the second pedal driving mechanism for operating the option pedal are arranged in positions apart from the driving sources corresponding to those. However, the present invention is not limited to such a configuration, but it is sufficient that at least one of the first pedal driving mechanism and the second pedal driving mechanism is arranged apart from the driving source.

For example, at least one of the first pedal driving mechanism and the second pedal driving mechanism may be arranged apart from the driving source corresponding to the one, and the driving source corresponding to the other may be arranged adjacently to the other.

Further, in the above embodiment, the first abutting portion 32a has the first plate-shaped portions 32e, and the second abutting portion 33a has the second plate-shaped portions 33e. Furthermore, the operator is capable of stepping on the pedals together with those plate-shaped portions. However, the present invention is not limited to such a configuration, but a configuration is adequate in which the operator can step on the pedal together with the abutting portion. For example, rod-shaped portions may be included instead of the plate-shaped portions.

Note that a work machine operation mechanism of the present invention is a work machine operation mechanism inclining a pedal based on a drive command, the pedal being for controlling an action of a work machine in accordance with inclination, the work machine operation mechanism including:

a driving source which generates a driving force based on the drive command; and a driving mechanism which inclines the pedal by the driving force from the driving source, in which the driving mechanism has an abutting portion which abuts a pedal surface of the pedal as a surface which is stepped on when an operator performs an operation and a driving unit which inclines the pedal by moving the abutting portion, and the driving unit is arranged in a position shifted to a lateral side from a space in which the abutting portion moves.

As described above, in the work machine operation mechanism of the present invention, the abutting portion abuts the pedal surface. Further, the pedal is inclined by being pushed by the moved abutting portion. That is, the pedal can be inclined also by moving the abutting portion by stepping or the like by the operator. Accordingly, even in a state where this operation mechanism is installed, the operator steps on the pedal together with the abutting portion and can thereby operate the pedal.

In addition to this, in the work machine operation mechanism of the present invention, the abutting portion which abuts the pedal and the driving unit which moves the abutting portion are arranged as separate bodies, and the driving unit is arranged in a position shifted to a lateral side from the space in which the abutting portion moves. Accordingly, even in a state where this operation mechanism is installed, when the operator operates the pedal, the driving unit is less likely to contact with the foot of the operator.

Consequently, in the work machine operation mechanism of the present invention, even in a state where that is installed, a direct operation of the pedal by the operator is less likely to be hindered by the abutting portion and the driving unit.

Further, in the work machine operation mechanism of the present invention, the driving unit preferably has a speed reducer which includes a first gear and a second gear, and the first gear and the second gear are preferably arranged to be arrayed in an up-down direction.

In such a configuration, the sizes of the driving unit in the front-rear direction and in the left-right direction are decreased, and a space for attaching the work machine operation mechanism can thereby be reduced for space saving. Accordingly, because a sufficient space around the pedal is easily secured, movement of the foot of the operator in the front-rear direction and the left-right direction is less likely to be restricted. Moreover, a direct operation of the pedal by the operator is further less likely to be hindered.

Further, a situation can also be inhibited where getting on and off of the operator is hindered by the work machine operation mechanism.

Further, in the work machine operation mechanism of the present invention, the pedal preferably includes a first pedal and a second pedal, the driving unit preferably includes a first driving unit which inclines the first pedal and a second driving unit which inclines the second pedal, and the driving mechanism preferably has a coupling portion which couples the first driving unit and the second driving unit together.

Depending on the kind of work machine, the work machine may include plural kinds of pedals (for example, a traveling pedal and an option pedal). In such a case, in a case where the driving units are arranged on lateral sides of the pedals as in the work machine operation mechanism of the present invention, work for positioning the operation mechanism with respect to each of the pedals and attaching the operation mechanism becomes necessary. Accordingly, as described above, when plural driving mechanisms are formed as a unit by the coupling portion, attachment work is simplified by omitting positioning work, and workload related to attachment work can thereby be reduced.

Further, in the work machine operation mechanism of the present invention, the abutting portion preferably has a plate shape which corresponds to the pedal surface.

In such a configuration, the operator can easily step on the traveling pedal together with the abutting portion.

Further, a work machine of the present invention includes any of the above work machine operation mechanisms.

REFERENCE SIGNS LIST 1 work machine
1a upper frame (frame)
1b traveling lever
1c left-side traveling pedal (left-side first pedal)
1d right-side traveling pedal (right-side first pedal)
1e left-side option pedal (left-side second pedal)
1f right-side option pedal (right-side second pedal)
1g slave-side seat
1h slave-side console box
1i work apparatus operation lever
1j frame-side positioning protrusion
2 remote operation device
3 first operation mechanism (work machine operation mechanism)
4 second operation mechanism (work machine operation mechanism)
5 driving source coupling portion
10 boom
10a first hydraulic cylinder
11 arm
11a second hydraulic cylinder
12 attachment
12a third hydraulic cylinder
13 revolving body
13a driver room
13b machine room
14 traveling body
15 slave-side operation device
16 operating-driving device
17 action state detector
18 outside environment sensor
19 slave-side control device
19a drive control unit
19b peripheral object detection unit
19c slave-side communication unit
20 remote operation room
21 master-side seat
22 master-side console box
23 master-side operation device
23a first operation pedal
23b first operation lever
23c second operation lever
24 speaker
25 display
26 operation state detector
27 master-side control device
27a output information control unit
27b master-side communication unit
30 first driving source
31 second driving source
32 first driving mechanism (first pedal driving mechanism)
32a first abutting portion
32b first driving unit
32c first rotating portion
32d first arm portion
32e first plate-shaped portion
32f housing
32g speed reducer
32h first gear
32i second gear
33 second driving mechanism (second pedal driving mechanism)
33a second abutting portion
33b second driving unit
33c second rotating portion
33d second arm portion
33e second plate-shaped portion
34 first transmission mechanism
34a first driving pulley
34b first driven pulley
34c first wire
34d first driving pulley cover
34e first driven pulley cover
34f insertion hole
35 second transmission mechanism
35a second driving pulley
35b second driven pulley
35c second wire
35d second driving pulley cover
35e second driven pulley cover
36 first coupling portion
37 first positioning protrusion
40 third driving source
41 fourth driving source
42 third driving mechanism (first pedal driving mechanism)
43 fourth driving mechanism (second pedal driving mechanism)
44 third transmission mechanism
44a third wire
45 fourth transmission mechanism
45a fourth wire
46 second coupling portion
47 second positioning protrusion
S remote operation system
c inclination fulcrum

The invention claimed is:

1. A work machine operation mechanism inclining a pedal based on a drive command, the pedal being rotated about a rotation axis line as a center and being inclined in a front-rear direction for controlling an action of a work machine in accordance with inclination, the work machine operation mechanism comprising:

a driving source which generates a driving force based on the drive command; and a driving mechanism which inclines the pedal by the driving force from the driving source, wherein the driving mechanism has an abutting portion which abuts a pedal surface of the pedal as a surface which is stepped on when an operator performs an operation and a driving unit which inclines the pedal by inclining the abutting portion, the driving unit is arranged in a position shifted to a lateral side from a space in which the abutting portion moves, and the abutting portion includes a front side abutting portion which extends from a side of the pedal toward the pedal side and abuts the pedal surface on a front side than the rotation axis line and a rear side abutting potion which extends from the side of the pedal toward the pedal side and abuts the pedal surface on a rear side than the rotation axis line.

2. The work machine operation mechanism according to claim 1, wherein the driving unit has a speed reducer which includes a first gear and a second gear, and the first gear and the second gear are arranged to be arrayed in an up-down direction.

3. The work machine operation mechanism according to claim 1, wherein the pedal includes a first pedal and a second pedal, the driving unit includes a first driving unit which inclines the first pedal and a second driving unit which inclines the second pedal, and the driving mechanism has a coupling portion which couples the first driving unit and the second driving unit.

4. The work machine operation mechanism according to claim 1, wherein the abutting portion is a plate shape or a rod shape member which corresponds to the pedal surface.

5. A work machine comprising the work machine operation mechanism according to claim 1.

6. A work machine operation mechanism inclining a pedal based on a drive command, the pedal being rotated about a rotation axis line as a center and being inclined in a front-rear direction for controlling an action of a work machine in accordance with inclination, the work machine operation mechanism comprising:

a driving source which generates a driving force based on the drive command; and a driving mechanism which inclines the pedal by the driving force from the driving source, wherein the driving mechanism has an abutting portion which abuts a pedal surface of the pedal as a surface which is stepped on when an operator performs an operation and a driving unit which inclines the pedal by inclining the abutting portion, and the driving unit is arranged in a position shifted to a lateral side from a space in which the abutting portion moves, and the abutting portion is rotated about an axis line as a center, the axis line passing through an inclination fulcrum coinciding with the rotation axis line, and is inclined in the front rear direction.

* * * * *